(12) United States Patent
Lehman et al.

(10) Patent No.: US 8,916,486 B2
(45) Date of Patent: Dec. 23, 2014

(54) METHOD OF REDUCING THE OCCURRENCE OF CRYSTALLINE SILICA IN FOAMED GLASS BY THE INTRODUCTION OF CHEMICAL ADDITIVES

(76) Inventors: Richard Lehman, Princeton, NJ (US); Steven Haines, Santa Fe, NM (US); Andrew Ungerleider, Santa Fe, NM (US)

(*) Notice: Subject to any disclaimer, the term of this patent is extended or adjusted under 35 U.S.C. 154(b) by 0 days.

(21) Appl. No.: 12/132,819

(22) Filed: Jun. 4, 2008

(65) Prior Publication Data

US 2009/0133440 A1  May 28, 2009

Related U.S. Application Data

(63) Continuation-in-part of application No. 10/848,844, filed on May 19, 2004, now abandoned.

(51) Int. Cl.
*C03C 11/00* (2006.01)
*C03B 19/08* (2006.01)

(52) U.S. Cl.
CPC .................................. *C03C 11/007* (2013.01)
USPC ................................................ 501/39; 65/22

(58) Field of Classification Search
CPC ............................. C03C 11/007; C03B 19/08
USPC ................................................. 501/39; 65/22
See application file for complete search history.

(56) References Cited

U.S. PATENT DOCUMENTS

| | | | |
|---|---|---|---|
| 3,840,380 A | 10/1974 | Kraemer et al. | |
| 3,951,632 A | 4/1976 | Seki et al. | |
| 4,347,326 A | 8/1982 | Iwami et al. | |
| 4,430,108 A | 2/1984 | Hojaji et al. | |
| 4,853,198 A | 8/1989 | Orii et al. | |
| 4,981,820 A | 1/1991 | Renlund et al. | |
| 5,063,180 A | 11/1991 | Stevens et al. | |
| 5,154,905 A | 10/1992 | Ohshima et al. | |
| 5,179,062 A | 1/1993 | Dufour | |
| 5,516,351 A | 5/1996 | Solomon et al. | |
| 5,525,556 A | 6/1996 | Dunmead et al. | |
| 5,538,674 A | 7/1996 | Nisper et al. | |
| 5,603,887 A | 2/1997 | Eschner | |
| 5,643,843 A | 7/1997 | Dunmead et al. | |
| 5,972,817 A | 10/1999 | Haines et al. | |
| 6,375,735 B1 | 4/2002 | Stephens et al. | |
| 6,409,817 B1 | 6/2002 | Stephens | |
| 6,548,436 B2 | 4/2003 | Rior, Jr. et al. | |
| 2002/0158373 A1 | 10/2002 | Prior, Jr. et al. | |
| 2003/0003041 A1 | 1/2003 | Samuel | |
| 2004/0050100 A1 * | 3/2004 | Ungerleider et al. | 65/22 |

FOREIGN PATENT DOCUMENTS

JP           57092546         *    6/1982

OTHER PUBLICATIONS

Hawley, "Definition of water glass", *The Condensed Chemical Dictionary*, (1974), p. 810.

* cited by examiner

*Primary Examiner* — Karl Group
(74) *Attorney, Agent, or Firm* — Brannon Sowers & Cracraft PC; C. John Brannon

(57) ABSTRACT

A method of making a foamed glass body, including preparing an admixture of powdered glass, at least one carbonate based foaming agent, and at least devitrification inhibitor, heating the admixture to a first temperature to soften the glass, heating the admixture to a second, higher temperature to foam the softened glass into a foamed glass body, and cooling the foamed glass body. The crystal silica content of the so-formed foamed glass body is less than 1 weight percent.

4 Claims, No Drawings

METHOD OF REDUCING THE OCCURRENCE OF CRYSTALLINE SILICA IN FOAMED GLASS BY THE INTRODUCTION OF CHEMICAL ADDITIVES

CROSS-REFERENCE TO RELATED APPLICATIONS

This patent application is a continuation-in-part of and claims priority to then U.S. patent application Ser. No. 10/848,844, filed May 19, 2004, now abandoned.

TECHNICAL FIELD

The novel technology relates generally to the field of ceramic materials and, specifically, to a method of making foamed glass while significantly reducing or eliminating crystalline silica from the finished product.

BACKGROUND

Silica is the generic term for minerals and other materials with the chemical formula $SiO_2$. Silica collectively describes crystalline and non-crystalline forms. Crystalline silica (such as quartz, crystobalite, and tridymite) occurs in nature and can also be artificially produced by heating silicate glasses or other amorphous silicates.

Occupational exposure to crystalline silica dust constitutes a serious health hazard. This health hazard is also a concern for consumers using products containing crystalline silica. Silica is found in a large number of consumer products. Spackling patching and taping for drywall construction are formulated from minerals including crystalline silica, and silica flour is added to a multitude of consumer products such as toothpaste, scouring powders, wood fillers, soaps, paints and porcelain. Consumers may be exposed to respirable crystalline silica from such sources as abrasives, sand paper, detergent, cement and grouts. The primary health concerns in those exposed to silica dust are the fibrogenic capacity of the inhaled silica particles that can lead to the development of silicosis as well as an increased risk of tuberculosis. Nationally, the US Occupational Safety and Health Administration (OSHA) and the US National Institute for Occupational Safety and Health (NIOSH) set and regulate inhalation standards for silica dust. Internationally, the International Labour Organization (ILO) and the World Health Organization (WHO) have developed programs to reduce exposure of silica dust in developed and developing countries.

Workers in the foam glass manufacturing sector can be exposed to levels of crystalline silica during production. Consumers using foam glass blocks and powder for surface preparation by sanding, rubbing and/or scraping a surface to clean, abrade and polish such a surface may generate fine dust containing varying percentages of crystalline silica that may subsequently be inhaled. Workers in other industries can likewise be exposed to crystalline silica from foamed glass sources. The building material and insulation industries work with foamed glass in various forms and workers can be exposed in the cutting and handling of products made from foamed glass.

The manufacture of foamed glass includes a heating step that is conducive to transforming part of the amorphous ground glass (silica) into crystalline silica. The thermal profile required for production of foamed glass is often consistent with devitrification of the glass matrix. Crystalline silica, usually in the form of crystobalite, may be a devitrification product. In addition, some of the common foaming agents can accelerate the conversion rate of amorphous to crystalline silica and lower the temperature at which crystal growth occurs.

Crystalline silica is nucleated in vitreous, fused silica and siliceous glasses when the glass melt is cooled through the nucleation temperature range. Silica crystals grow in these glasses in a temperature range that is typically hotter than the nucleation range, although the two may overlap. The result is that during glass production, glass is cooled through the growth temperature range before it enters the nucleation range. Thus, siliceous glasses typically contain a substantial number of silica nuclei that have had little or no time to grow. However, when reheated for softening, such as inherent in the foaming process, these nuclei are thrust back into their growth temperature range and may now grow unchecked into silica crystals. Moreover, the reheating process takes the glass back through the nucleation range on its way to a softening temperature, where even more nuclei may be generated.

Thus, there is a need for a means for preventing or retarding further nucleation and growth of silica crystals in siliceous glass during the foaming process. The present novel technology addresses this need.

SUMMARY

The present novel technology relates to the reduction of crystalline silica in foamed glass. One object of the present application to improve foamed glass products. Related objects and advantages of the present novel technology will be apparent from the following description.

DETAILED DESCRIPTION

For the purposes of promoting an understanding of the principles of the novel technology and presenting its currently understood best mode of operation, reference will now be made to the embodiments and specific language will be used to describe the same. It will nevertheless be understood that no limitation of the scope of the novel technology is thereby intended, with such alterations and further modifications in the device and such further applications of the principles of the novel technology being contemplated as would normally occur to one skilled in the art to which the novel technology relates.

The present novel technology relates to chemically retarding the devitrification of silica-based compositions for producing foamed glass. This is accomplished through the addition of one or more chemicals or compounds to a preparation that is to be used for producing foam glass to reduce silica crystallization to typically less than 1% by volume.

The foamed glass can be produced from, for example, a starting mixture that includes powdered, ground or otherwise granulated glass, a foaming agent, and a devitrification retarding agent. The glass may be virgin glass, recycled or waste glass, or a mixture thereof. In other words, the foamed glass precursor may be derived from but not limited to pre-consumer manufacturing, post-consumer waste or specifically designed virgin glass.

The foaming agent is typically a substance that releases a relatively high volume of typically non-reactive gas upon heating and the remaining material is also typically not detrimental to the properties of the glass. Typically, the foaming agent is non-sulfurous, and more typically the foaming agent is a carbonate material. Typically, the foaming agent is present in between about 0.1 and about 20.0 weight percent; more typically, it is present in an amount from about 0.5 to about 5.0 weight percent. Commonly used foaming agents include barium carbonate, calcium carbonate, magnesium carbonate, sodium carbonate, and mixtures thereof.

The glass precursor is typically powdered or ground, and is typically characterized by, for example, an average particle size distribution that ranges from 1-500 microns. Additional ingredients can be added to the mixture to change the characteristics to benefit the specifically designed finished product. The admixture is typically mixed for homogeneity and then heated to first soften the glass and then heated more to release the chemically bound gas (typically $CO_2$) from the foaming agent. The sudden release of the bound gas foams the softened glass to produce a foamed glass body characterized by a high degree of interconnected porosity.

Products made of foamed glass or containing foamed glass may include, for example, discs, blocks or powders for preparing surfaces such as by sanding, rubbing and/or scraping the same to clean abrade, polish, smooth or the like. In addition, foamed glass can be made, for example, into various structural and/or building materials such as, but not limited to, agricultural substrates, soil amendments, protective barriers, concrete aggregate, insulation, substrates for composite building panels and the like.

One mechanism leading to crystallization results from heterogeneous nucleation on the material surface. Since the glass precursor material is typically powdered and thus is characterized by a very high surface area to volume ratio, the total surface area of the glass precursor is not inconsiderable. Additives can be used to alter the glass surface chemistry. The presence of highly stable glass-forming additives not prone to nucleation can prevent or inhibit nucleation by the mechanism of inhibited kinetics. Generally, adding more nucleation inhibitors that promote the formation of siliceous compounds reduces silica crystallization and/or growth rates since single component phases crystallize more rapidly. Other additives can be employed to encourage the formation of one or more crystalline silicate phases, each characterized by at least two cation constituents (instead of a pure silica phase). These silicate phases typically are not indicated on regulatory lists subject to control and also typically preclude the formation of crystalline silica.

A previous manufacturing process reported data indicating cristobalite levels of 10 to 11%. X-ray diffraction analysis (XRD) was used to determine the presence of crystallinity. Semi-quantitative XRD was conducted on small, finely ground samples of foam glass using an automated diffractometer. The level of detection for cristobalite was categorized as approximately 1% (volume basis).

The main approach was surface vitrification by the addition of glass formers to the glass powder prior to foaming. A number of potential devitrification inhibitors (or vitrification enhancers) were experimentally tested. A number of additives, which were successful in the reduction of devitrification of the glass, were eliminated due to their deleterious effect on the finished product. Results showing the effect of the relative amount of devitrification additive on devitrification (as measured by crystal content) were graphed. Theoretical zero points were extrapolated for potential devitrification inhibiting additives. Additives with very shallow graph slopes were eliminated due to the excessively high amounts of additives required to have the desired devitrification inhibiting effect. A number of devitrification inhibitors were successful in substantially eliminating the growth of cristobalite without otherwise detrimentally affecting the finished product. For example, various additions of chemicals such as, but not limited to, potassium phosphate tribasic, potassium phosphate, sodium phosphate and zinc oxide reduced the XRD analysis to the non-detect level for cristobalite. These additives typically substantially retard devitrification when added in amounts comprising less than 20% of the total foamed glass admixture by weight, and, more typically, constitute less than 10% of the preparation that is to be used to produce foam glass.

EXAMPLES

Example 1

To make a foam glass surface preparation product for stripping paint off wood or metal, a mixture of the following substituents was provided:
97.5% (by weight) ground soda/lime glass, −200 mesh
11% calcium carbonate, −200 mesh
1.5% zinc oxide, −200 mesh The mixture was then appropriately heated, softened and foamed and the resultant foamed glass body was subsequently annealed. The addition of zinc oxide reduced the crystobalite levels from 6% to below detection limit, or BDL, in the resulting foam glass product.

Example 2

To make a foam glass surface preparation product for heavy duty household cleaning the following substituents were provided:
94.2% (by weight) ground soda/lime glass, −325 mesh
1% calcium carbonate, −325 mesh
4.8% potassium phosphate tribasic, −400 mesh The admixture was homogenized, heated to soften the glass and then further heated to foam the softened glass into a foamed glass body. The foamed glass body was subsequently cooled and analyzed by XRD to reveal that the addition of potassium phosphate tribasic reduced the cristobalite levels from 11% to <1% (BDL).

Example 3

To make a foam glass substrate of a composite building panel the following substituents were provided:
92.6% (by weight) ground soda/lime glass, −200 mesh
1.5% calcium carbonate, −200 mesh
0.5% magnesium carbonate, −200 mesh
5.4% sodium phosphate, −300 mesh The preparation was heated and foamed, and the resultant foamed glass loaf was analyzed to reveal that the addition of sodium phosphate reduced the cristobalite levels from 8% to <1% (non-detect).

While the novel technology has been described in detail in the foregoing description, the same is to be considered as not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

We claim:
1. A method of making a foamed glass article, comprising:
mixing powdered glass, at least one carbonate based foaming agent, and at least one phosphate-based vitrification enhancer to define an admixture;

heating the admixture to a first dilatometric softening temperature;

soaking the heated admixture at about the first dilatometric softening temperature;

heating the admixture to a second, higher foaming temperature;

foaming the admixture to yield a foamed glass body; and cooling the foamed glass body to below the dilatometric softening temperature;

wherein the vitrification enhancer is selected from the group consisting of potassium phosphate, potassium phosphate tribasic, sodium phosphate and combinations thereof;

wherein the foamed glass body has a cristobalite content of less than about 1 weight percent.

2. The method of claim 1 wherein the foamed glass body contains less than about 1 weight percent crystalline silica.

3. A method of foaming a glass preparation, comprising:

combining powdered glass, at least one carbonate based foaming agent, and at least one phosphate-based devitrifying additive to define an admixture;

heating the admixture to a first temperature to soften the glass;

holding the admixture at the first temperature for a predetermined period of time;

further heating the admixture to release gas to foam the softened glass; and preventing the softened glass from devitrifying more than 1.0 weight percent during heating.

4. The method of claim 3 wherein the devitrifying additive is selected from the group consisting of potassium phosphate, potassium phosphate tribasic, sodium phosphate, zinc oxide, and combinations thereof.

* * * * *